US012740596B2

(12) United States Patent
Stura et al.

(10) Patent No.: US 12,740,596 B2
(45) Date of Patent: Sep. 22, 2026

(54) AEROSOL-GENERATING DEVICE WITH MEANS FOR DETECTING THE PRESENCE, ABSENCE, OR DISPLACEMENT OF AN AEROSOL-GENERATING ARTICLE IN A CAVITY OF THE DEVICE

(71) Applicant: Philip Morris Products S.A., Neuchatel (CH)

(72) Inventors: Enrico Stura, Palezieux-Village (CH); Maxime Chateau, Montlebon (FR)

(73) Assignee: Philip Morris Products S.A., Neuchatel (CH)

( * ) Notice: Subject to any disclaimer, the term of this patent is extended or adjusted under 35 U.S.C. 154(b) by 713 days.

(21) Appl. No.: 18/003,033

(22) PCT Filed: Jun. 21, 2021

(86) PCT No.: PCT/EP2021/066771
§ 371 (c)(1),
(2) Date: Dec. 22, 2022

(87) PCT Pub. No.: WO2021/259834
PCT Pub. Date: Dec. 30, 2021

(65) Prior Publication Data

US 2023/0248066 A1 Aug. 10, 2023

(30) Foreign Application Priority Data

Jun. 23, 2020 (EP) .................................... 20181564

(51) Int. Cl.
*A24F 40/51* (2020.01)
*A24F 40/20* (2020.01)
(Continued)

(52) U.S. Cl.
CPC .............. *A24F 40/51* (2020.01); *A24F 40/20* (2020.01); *A24F 40/465* (2020.01); *A24F 40/53* (2020.01); *H05B 6/105* (2013.01)

(58) Field of Classification Search
None
See application file for complete search history.

(56) References Cited

U.S. PATENT DOCUMENTS

2017/0135406 A1 5/2017 Reevell
2017/0150755 A1 * 6/2017 Batista .................... A24F 40/30
(Continued)

FOREIGN PATENT DOCUMENTS

CA 3 096 955 A1 9/2019
CN 106455708 A 2/2017
(Continued)

OTHER PUBLICATIONS

Combined Russian Office Action and Search Report issued Oct. 8, 2024, in corresponding Russian Patent Application No. 2023101168/03(002463) (with English Translation and English Translation of Category of Cited Documents), 9 pages.
(Continued)

*Primary Examiner* — Michael H. Wilson
*Assistant Examiner* — Daniel Edward Vakili
(74) *Attorney, Agent, or Firm* — Oblon, McClelland, Maier & Neustadt, L.L.P.

(57) ABSTRACT

An aerosol-generating device for heating an aerosol-forming substrate to form an inhalable aerosol when heated, the device including: a cavity configured to removably receive at least a portion of an article, including the substrate to be heated; an electrical heating arrangement including an electronic circuitry and a heating element operatively coupled to the electronic circuitry configured to heat the substrate when the article is received in the cavity; and a controller includ-
(Continued)

ing a temperature sensor configured to output a signal indicative of a temperature or a temperature increase of at least one portion of the electronic circuitry during operation of the heating arrangement, the controller being configured to detect a presence, absence, or displacement of the article in the cavity in response to the signal indicating that the temperature or the temperature increase has breached a predefined temperature threshold or a predefined temperature increase threshold, respectively.

18 Claims, 3 Drawing Sheets

(51) Int. Cl.

| | |
|---|---|
| ***A24F 40/465*** | (2020.01) |
| ***A24F 40/53*** | (2020.01) |
| ***H05B 6/10*** | (2006.01) |

(56) References Cited

U.S. PATENT DOCUMENTS

| | | | |
|---|---|---|---|
| 2020/0085100 | A1 | 3/2020 | Hoffman |
| 2020/0093185 | A1 | 3/2020 | Lim |

FOREIGN PATENT DOCUMENTS

| | | | | | |
|---|---|---|---|---|---|
| CN | 107397255 | A | | 11/2017 | |
| CN | 109310153 | A | | 2/2019 | |
| CN | 110612034 | A | | 12/2019 | |
| EP | 2 797 446 | B1 | | 10/2017 | |
| IN | 201617036731 | A | | 3/2017 | |
| JP | 2015-507476 | A | | 3/2015 | |
| KR | 10-2006-0086010 | | | 7/2006 | |
| KR | 10-2020-0071391 | | | 6/2020 | |
| WO | WO 2019/146063 | A1 | | 8/2019 | |
| WO | WO-2019173923 | A1 | * | 9/2019 | ............. A24F 40/42 |
| WO | WO 2019/206916 | A1 | | 10/2019 | |
| WO | WO 2020/008008 | A1 | | 1/2020 | |
| WO | WO-2020193176 | A1 | * | 10/2020 | ............. A24F 40/51 |
| WO | WO 2021/037403 | A1 | | 3/2021 | |

OTHER PUBLICATIONS

International Search Report and Written Opinion issued Oct. 22, 2021 in PCT/EP2021/066771 filed on Jun. 21, 2021, 8 pages.
Japanese Office Action issued Jun. 24, 2025 in Japanese Patent Application No. 2022-579043 (with unedited computer-generated English Translation), 5 pages.
Malaysian Substantive Examination Clear Report—Section 30(1) issued Sep. 3, 2025, in corresponding Malaysian Patent Application No. PI2022007285, 3 pages.
Brazilian Office Action issued Sep. 23, 2025, in corresponding Brazilian Patent Application No. BR112022026085-7 (with informal English Translation), 5 pages.
Office Action issued Jan. 19, 2026 in Chinese Patent Application No. 202180043137.3, with English translation, citing documents 1-6 therein.
Office Action issued Mar. 2, 2026, in Korean Patent Application No. 10-2023-7001065, with English translation.

* cited by examiner

AEROSOL-GENERATING DEVICE WITH MEANS FOR DETECTING THE PRESENCE, ABSENCE, OR DISPLACEMENT OF AN AEROSOL-GENERATING ARTICLE IN A CAVITY OF THE DEVICE

BACKGROUND

The present disclosure relates to an aerosol-generating device and an aerosol-generating system comprising means for detecting the presence, absence, or displacement of an aerosol-generating article in a cavity of the aerosol-generating device. The disclosure further relates to a method for detecting the presence, absence, or displacement of an aerosol-generating article in a cavity of an aerosol-generating device.

Aerosol-generating devices used for generating inhalable aerosols by electrically heating aerosol-forming substrates are generally known from prior art. Such devices may comprise a cavity for removably receiving at least a portion of an aerosol-generating article that includes the aerosol-forming substrate to be heated. The devices further comprise an electrical heating arrangement for heating the substrate, when the article is received in the cavity. To ensure a proper functioning of the device as well as to avoid damages, it is important to accurately detect the presence, absence or displacement of an aerosol-generating article in the cavity, for example, in order to enable or disable the heating process. Such kind of detection may be realized by sensor means which are arranged inside the cavity. There, the sensor means are exposed to heat, moisture and—in the case of inductively heating devices—high-frequency electromagnetic fields. Such conditions can make the detection susceptible to adverse interference effects. In addition, the sensor may get damaged, in particular due to mechanical actions during cleansing of the cavity or during insertion or removal of the article into or from the cavity.

Therefore, it would be desirable to have an aerosol-generating device comprising means for detecting the presence, absence, or displacement of an aerosol-generating article in the cavity of the device as well as a corresponding method with the advantages of prior art solutions, whilst mitigating their limitations. In particular, it would be desirable to have an electrically heated aerosol-generating device and a method providing an improved detection of the presence, absence, or displacement of an aerosol-generating article in the cavity of the device.

BRIEF SUMMARY

According to an aspect of the present invention, there is provided an aerosol-generating device for heating an aerosol-forming substrate that is capable to form an inhalable aerosol when heated. The device comprises a cavity for removably receiving at least a portion of an aerosol-generating article comprising the aerosol-forming substrate to be heated. The device further comprises an electrical heating arrangement comprising an electronic circuitry and a heating element operatively coupled to the electronic circuitry for heating the aerosol-forming substrate when the aerosol-generating article is received in the cavity. In addition, the device comprises a controller comprising a temperature sensor configured to output a signal indicative of the temperature or a temperature increase of at least one portion of the electronic circuitry during operation of the heating arrangement. The controller is configured to detect the presence, absence, or displacement of the article in the cavity in response to the signal indicating that the temperature or the temperature increase has breached a predefined temperature threshold or a predefined temperature increase threshold, respectively.

According to the invention, it has been found that the temperature or the temperature increase of the electronic circuitry during operation of the heating arrangement is correlated to the aerosol-generating article being properly received in the cavity or displaced or absent from the cavity. In particular, it has been found that in normal operation, that is, if an aerosol-generating article is properly received in the cavity, power provided by the heating arrangement is mostly dissipated in or released in the aerosol-forming substrate of the article. Only a small portion of the power is dissipated in the electronic circuitry of the heating arrangement. Conversely, if the aerosol-generating article is displaced or absent from the cavity, power provided by the heating arrangement is mostly dissipated in the electronic circuitry. This will cause the temperature of at least a portion of the electronic circuitry to change differently than during normal operation, when the article is properly received in the cavity. In particular, if the aerosol-generating article is displaced or absent from the cavity, the temperature of the at least one portion of the electronic circuitry may increase to temperatures higher than the temperatures occurring during normal operation. Likewise, if the aerosol-generating article is displaced or absent from the cavity, the temperature of the at least one portion of the electronic circuitry may increase stronger, in particular more rapidly than during normal operation, when the article is properly received the cavity.

Accordingly, by monitoring the temperature of at least a portion of the electronic circuitry of the heating arrangement for temperatures or temperature increases breaching a predefined temperature threshold or a predefined temperature increase threshold, the control circuitry may reliably detect whether the aerosol-generating article is present in the cavity or displaced or absent from the cavity.

Consequently, in case the displacement or absence of the article is detected, operation of the heating arrangement may be disabled. Advantageously, this allows the aerosol-generating device, in particular the electronic circuitry of the heating arrangement, to be protected from damages. In particular, if the signal indicative of the temperature or the temperature increase of the at least one portion of the electronic circuitry is higher than (or equal to or higher than) the predefined temperature threshold or the predefined temperature increase threshold, the controller may detect the displacement or absence of the article. Conversely, if the signal indicative of the temperature or the temperature increase of the at least one portion of the electronic circuitry is lower than or equal to (or lower than) the predefined temperature threshold or the predefined temperature increase threshold, the controller may detect the presence of the article in the cavity. Accordingly, the controller may be configured to compare the signal indicative of the temperature or the temperature increase of the at least one portion of the electronic with a predefined temperature threshold or a predefined temperature increase threshold, respectively.

Operation of the heating arrangement may comprise at least one of a calibration operation of the heating arrangement, a preheating operation of the heating arrangement or a heating operation of the heating arrangement or an article detection operation of the heating arrangement. A calibration operation may comprise a calibration of the heating power in order to achieve a desired operating temperature for heating the aerosol-forming substrate in the article. A preheating operation may comprise preheating of the aerosol-forming substrate at the beginning of a user experience up to an operation temperature sufficient to release volatile compounds from the substrate that can form an aerosol. A heating operation may be heating of the aerosol-forming substrate in the article at the operation temperature in order to release volatile compounds from the substrate such as to form an aerosol. An article detection operation may comprise detecting the insertion or extraction of an aerosol-generating article into or from the cavity, in particular by using the heating arrangement, for example, by detect a change of at least one property of the heating arrangement due to the article or a specific part of the article, for example, a susceptor, becoming present within or absent from the cavity when an aerosol-generating article is inserted into or extracted from the cavity.

As used herein, the term "temperature increase" relates to an increase of the temperature of at least a portion of the electronic circuitry above an initial temperature of that portion, in particular an initial temperature of that portion at the beginning of the operation of the heating arrangement. The temperature increase may occur during a calibration operation of the heating arrangement, or during a preheating operation of the heating arrangement or during a heating operation of the heating arrangement or during an article detection operation of the heating arrangement. The initial temperature may be assumed, but not measured. For instance, the initial temperature may be assumed to be room temperature, in particular 20 degree Celsius.

In general, the temperature increase may be the difference between the temperature of the at least one portion of the electronic circuitry at a first time, in particular at the beginning of the operation of the heating arrangement, and the temperature of the at least one portion of the electronic circuitry at a later second time or after elapse of a predefined time period after the first time. For example, the temperature increase may be the difference between the temperature of the at least one portion of the electronic circuitry at the beginning of a calibration operation or a preheating operation or a heating operation, and the temperature of the at least one portion of the electronic circuitry after elapse of predefined time period.

Accordingly, for providing a signal indicative of the temperature increase, the temperature sensor and the controller may be configured to detect the temperature of the at least one portion of the electronic circuitry at a first time, in particular at the beginning of the operation of the heating arrangement, and at a later second time or after elapse of a predefined time period after the first time.

The predefined time period may be in a range between 0.5 seconds and 4 seconds, in particular between 1 second and 3 seconds, for example 2 seconds.

The temperature increase may be parameterized by the following equation: $Delta\_T=[T(t\mathbf{2})-T(t\mathbf{1})]$, wherein $Delta_T$ is the temperature increase, $T(t\mathbf{1})$ is the initial temperature of the at least one portion of the electronic circuitry at the first time $t\mathbf{1}$ and, $T(t\mathbf{2})$ is the temperature of the at least one portion of electronic circuitry at the second time $t\mathbf{2}$ or after elapse of predefined time period $t=t\mathbf{2}-t\mathbf{1}$ after the first time $t\mathbf{1}$.

The signal output by the temperature sensor may be an ADC (Analog-Digital-Converter) value which correlates with temperature such that the ADC value is low when the temperature is high, while the ADC value is high when the temperature is low. In this case, with regard to the signal output by the temperature sensor, the signal indicative of the temperature increase may be parameterized by the following equation: $Delta\_S=[S(t\mathbf{1})-S(t\mathbf{2})]$, wherein $Delta_S$ is the signal indicative of the temperature increase, $S(t\mathbf{1})$ is the signal indicative of the initial temperature of the at least one portion of the electronic circuitry at the first time $t\mathbf{1}$ and, $S(t\mathbf{2})$ is the signal indicative of the temperature of the at least one portion of electronic circuitry at the second time $t\mathbf{2}$ or after elapse of predefined time period $t=t\mathbf{2}-t\mathbf{1}$ after the first time $t\mathbf{1}$. Here, the signal indicative of the temperature at the second time $t\mathbf{2}$ is subtracted from the signal indicative of the temperature at the first time $t\mathbf{1}$ in order to result in a positive value.

The predefined temperature increase threshold may be at least 80 degree Celsius, in particular at least 100 degree Celsius, preferably at least 120 degree Celsius. Likewise, the predefined temperature threshold may be in a range between 80 degree Celsius and 180 degree Celsius, in particular between 100 degree Celsius and 160 degree Celsius. These values are chosen to be above any usual fluctuations of the temperature of the electronic circuitry during normal operation of the device in order to avoid misinterpretation of the signal of the temperature sensor. Accordingly, these values ensure to avoid a false-positive detection of the absence or the displacement of an article in the cavity.

The detection of the presence, absence, or displacement of an aerosol-generating article in the cavity may also take into account that the heating rate of the electronic circuitry is smaller if the initial temperature of the electronic circuitry is already high at the beginning of the operation of the device. This may be the case, for example, when a new heating process follows shortly after a previous one. The heating rate is smaller because heating of a mass by a fixed temperature requires more heat if the mass has a higher initial temperature than if the mass has a lower initial temperature at the beginning of the heating process.

Accordingly, for determining whether the temperature increase has breached the corresponding predefined temperature threshold, at least one the temperature increase or the signal indicative of the temperature increase may be re-scaled by a predefined function of the initial temperature of the at least one portion of the electronic circuitry at the beginning of the operation of the heating arrangement. The predefined function may be a linear function or a quadratic function or the multiplicative inverse (reciprocal) of the initial temperature of the at least one portion of the electronic circuitry at the beginning of the operation of the heating arrangement.

In particular, the temperature increase may be re-scaled according to the following function: $Delta\_T\_scal=[T(t)-T(\mathbf{0})]*[c*T(\mathbf{0})-d]$, wherein $Delta\_T\_scal$ is the re-scaled temperature increase to be compared with the predefined temperature increase threshold, $T(\mathbf{0})$ is the initial temperature of the at least one portion of the electronic circuitry at the beginning of the operation of the device, $T(t)$ is the temperature of the at least one portion of electronic circuitry after elapse of a predefined time t after the beginning of the operation of the device, and the coefficients c and d are constants obtainable by calibration. The coefficients c and d may be generally based on the thermal configuration of the device, taking account the mass of the device as well as the specific arrangement of possible heat sinks and thermal insulation components. That is, the values of the coefficients c and d are based on the physical characteristics of the entire system. As can be seem from this example, the temperature increase is multiplied by the initial temperature or by a linear function of the initial temperature to give more weight to temperature increases when the device is hot.

In case the signal output by the temperature sensor is an ADC (Analog-Digital-Converter) value which correlates with temperature such that the ADC value is low when the temperature is high, while the ADC value is high when the temperature is low (see above), re-scaling requires dividing (instead of multiplying) the signal indicative of the temperature increase by the signal indicative of the initial temperature in order to give more weight to temperature increases when the device is hot. Accordingly, in this example, the signal indicative of the temperature increase may be re-scaled according to the following function: Delta_S_scal=k*[S(0)−S(t)]/S(0), wherein Delta_S_scal is the re-scaled signal indicative of the temperature increase to be compared with a predefined signal value corresponding to the predefined temperature increase threshold, S(0) is the signal indicative of the initial temperature of the at least one portion of the electronic circuitry at the beginning of the operation of the device and S(t) is the signal indicative of the temperature of the at least one portion of electronic circuitry after elapse of a predefined time t after the beginning of the operation of the device. The coefficient k is a constant obtainable by calibration.

Likewise, the signal indicative of the temperature increase may be compared with a predefined temperature increase threshold which is a function of the initial temperature of the at least one portion of the electronic circuitry at the beginning of the operation of the heating arrangement. That is, the predefined temperature increase threshold may be a function of the initial temperature of the at least one portion of the electronic circuitry at the beginning of the operation of the heating arrangement. In other words, the temperature increase (or the signal indicative of the temperature increase) may be compared with a predefined temperature increase threshold re-scaled by a predefined function of the initial temperature of the at least one portion of the electronic circuitry at the beginning of the operation of the heating arrangement. Accordingly, the controller may be configured to detect the presence, absence, or displacement of the article in the cavity in response to the signal indicating that the temperature or the temperature increase has breached a predefined temperature increase threshold that is re-scaled by a predefined function of the initial temperature of the at least one portion of the electronic circuitry at the beginning of the operation of the heating arrangement.

With respect to this aspect, the controller may be configured to detect the initial temperature of the at least one portion of the electronic circuitry at the beginning of the operation of the device and to re-scale the signal indicative of the temperature increase by a predefined function of the detected initial temperature for comparing the re-scaled signal indicative of the temperature increase with the predefined temperature increase threshold. That is, the controller may be configured to detect the presence, absence, or displacement of the article in the cavity in response to the re-scaled signal indicating that the temperature or the temperature increase has breached a predefined temperature threshold or a predefined temperature increase threshold, respectively. The function for re-scaling may be the exemplary function Delta_T_scal or Delta_S_scal, respectively, given above.

It is also possible the controller may be configured to detect the initial temperature of the at least one portion of the electronic circuitry at the beginning of the operation of the device and to determine the predefined temperature increase threshold as a function of the detected initial temperature. Likewise, the controller may be configured to detect the initial temperature of the at least one portion of the electronic circuitry at the beginning of the operation of the device and to re-scale the predefined temperature increase threshold by a predefined function of the initial temperature of the at least one portion of the electronic circuitry at the beginning of the operation of the heating arrangement, in order to compare the re-scaled predefined temperature increase threshold with the signal indicative of the temperature increase.

The temperature sensor may comprise at least one of a thermocouple, a thermistor or a semiconductor integrated circuit sensor.

A thermocouple is an electrical device consisting of two dissimilar electrical conductors forming an electrical junction. A thermocouple produces a temperature-dependent voltage as a result of the thermoelectric effect, and this voltage can be interpreted to measure temperature. Thermocouples are advantageous because of their low costs, simplicity, fast thermal response, wide temperature range and robustness.

A thermistor is a type of resistor whose resistance is reliably dependent on temperature. Thermistors are of two opposite fundamental types: With NTC (negative temperature coefficient) thermistors, resistance decreases as temperature rises. With PTC (positive temperature coefficient) thermistors, resistance increases as temperature rises. Accordingly, the temperature sensor may comprise a NTC thermistor or a PTC thermistor. Preferably, the temperature sensor comprises a NTC thermistor.

Semiconductor integrated circuit sensors offer a high degree of linearity in output and do not require linearization or cold junction compensation. They can be made on the same chip and process as any other electronic chip function. Therefore, they are easily amenable to high levels of integration. They provide high output levels yielding good noise immunity. In particular, they are readily interfaced to any other analogue or digital circuit. With a wide operating temperature range, they are qualified for numerous types of electronic circuit—especially as they may provide many useful output levels in logic, pulse, digital or analogue form.

The controller may be configured to stop or to restrict operation of the electrical heating arrangement in response to detecting the displacement or the absence of the article. In particular, the controller may be configured to restrict operation of the electrical heating arrangement by reducing the power provided by the heating arrangement. For example, the power may be reduced to 50 percent or 40 percent or 30 percent or 20 percent or 10 percent of the power during normal operation of the heating arrangement, that is, when an aerosol-generating system is present at a desired position in the cavity. Advantageously, this allows to save electrical power and to protect the heating arrangement from damages.

As already described further, the controller may be configured to detect a presence of the article at a desired position in the cavity in response to the signal indicating that the temperature or the temperature increase has fallen below the predefined temperature threshold or the predefined temperature increase threshold, respectively. In addition, the controller may be configured to enable heating operation of the electrical heating arrangement in response to detecting the presence of the article at the desired position in the cavity.

Preferably, the at least one portion of the electronic circuitry is monitored for excessive temperatures or temperature increases at close intervals. Accordingly, the controller may be configured to monitor the temperature of the at least one portion of the electronic circuitry at least every 10 seconds, in particular at least every 5 seconds, preferably at least every 2 seconds, more preferably at least every second.

The electrical heating arrangement may be an inductive heating arrangement for inductively heating the aerosol-forming substrate within the article. The inductive heating arrangement may comprise an induction source including an induction coil for generating a varying, in particular an alternating magnetic field within the cavity. In particular, the heating element of the inductive heating arrangement may comprise or may be the at least one induction coil for generating a varying, in particular an alternating magnetic field within the cavity. The varying magnetic field may be high-frequency varying magnetic field. The varying magnetic field may be in the range between 500 kHz (kilo-Hertz) to 30 MHz (Mega-Hertz), in particular between 5 MHz to 15 MHz, preferably between 5 MHz and 10 MHz. The varying magnetic field is used to inductively heat a susceptor du to at least one of Eddy currents or hysteresis losses, depending on the electrical and magnetic properties of the susceptor material. In use, the susceptor is in thermal contact with or thermal proximity to an aerosol-forming substrate to be heated, when the article is received in the cavity of the device. In general, the susceptor may be either part of the aerosol-generating device or part of the aerosol-generating article comprising the aerosol-forming substrate to be heated.

The at least one induction coil may be a helical coil or flat planar coil, in particular a pancake coil or a curved planar coil. The at least one induction coil may be held within one of a main body or a housing of the aerosol-generating device. The induction coil may be arranged such as to surround at least a portion of the cavity or at least a portion of the inner surface of the cavity, respectively. For example, the induction coil may be an induction coil a helical coil, arranged within a side wall of the cavity.

The induction source may comprise an alternating current (AC) generator. The AC generator may be powered by a power supply of the aerosol-generating device. The AC generator is operatively coupled to the at least one induction coil. In particular, the at least one induction coil may be integral part of the AC generator. The AC generator is configured to generate a high frequency oscillating current to be passed through the at least one induction coil for generating an alternating magnetic field. The AC current may be supplied to the at least one induction coil continuously following activation of the system or may be supplied intermittently, such as on a puff by puff basis.

The aforementioned components of the induction source—apart from the induction coil (heating element)—may form part of the electrical circuitry. These components may be arranged on a printed circuit board (PCB).

Preferably, the induction source comprises a DC/AC converter connected to the DC power supply including an LC network, wherein the LC network comprises a series connection of a capacitor and the inductor. In addition, the induction source may comprise a matching network for impedance matching. In particular, the induction source comprise may comprise a power amplifier, for example a Class-C power amplifier or a Class-D power amplifier or Class-E power amplifier It is also possible that the electrical heating arrangement may be a resistive heating arrangement for resistively heating the aerosol-forming substrate within the article. In this configuration, the heating element may comprise a resistive heating element. The resistive heating element may be, for example, a resistive heating wire or a resistive heating coil or a resistive heating track (in particular a resistive heating track provided a heating blade), a resistive heating grid or a resistive heating mesh. In use of the device, the resistive heating element is in thermal contact with or thermal proximity to an aerosol-forming substrate to be heated.

The aerosol-generating device may further comprise a controller configured to control operation of the heating process, preferably in a closed-loop configuration, in particular for controlling heating of the aerosol-forming substrate to a pre-determined operating temperature. The operating temperature used for heating the aerosol-forming liquid may be in a range between 100 degree Celsius and 300 degree Celsius, in particular between 150 degree Celsius and 250 degree Celsius, for example 230 degree Celsius. In general, the operating temperature may depend on the type of theirs aerosol-forming substrate to be heated. For example, the operating temperature for liquid is aerosol-forming substrates may be lower than the operating temperature for solid aerosol forming substrates.

The controller may be a main control unit (MCU) of the aerosol-generating device. The controller may comprise a microprocessor, for example a programmable microprocessor, a microcontroller, or an application specific integrated chip (ASIC) or other electronic circuitry capable of providing control. In particular, the induction source may be part of the controller.

The aerosol-generating device may comprise a power supply, in particular a DC power supply configured to provide a DC supply voltage and a DC supply current to the induction source. Preferably, the power supply is a battery such as a lithium iron phosphate battery. As an alternative, the power supply may be another form of charge storage device such as a capacitor. The power supply may require recharging, that is, the power supply may be rechargeable. The power supply may have a capacity that allows for the storage of enough energy for one or more user experiences. For example, the power supply may have sufficient capacity to allow for the continuous generation of aerosol for a period of around six minutes or for a period that is a multiple of six minutes. In another example, the power supply may have sufficient capacity to allow for a predetermined number of puffs or discrete activations of the induction source.

In case of an inductively heating aerosol-generating device, the aerosol-generating device may further comprise a flux concentrator arranged around at least a portion of the induction coil and configured to distort the alternating magnetic field of the at least one inductive source towards cavity. Thus, when the article is received in the cavity, the alternating magnetic field is distorted towards the inductively heatable liquid conduit, if present. Preferably, the flux concentrator comprises a flux concentrator foil, in particular a multi-layer flux concentrator foil.

The cavity may comprise an insertion opening through which an aerosol-generating article may be inserted into the cavity. As used herein, the direction in which the aerosol-generating article is inserted is denoted as insertion direction. Preferably, the insertion direction corresponds to the extension of a length axis, in particular a center axis of the cavity.

Upon insertion into the cavity, at least a portion of the aerosol-generating article may still extend outwards through the insertion opening. The outwardly extending portion preferably is provided for interaction with a user, in particular for being taken into a user's mouth. Hence, during use of the device, the insertion opening may be close to the mouth. Accordingly, as used herein, sections close to the insertion opening or close to a user's mouth in use of the device, respectively, are denoted with the prefix "proximal". Sections which are arranged further away are denoted with the prefix "distal".

The cavity may have any suitable cross-section as seen in a plane perpendicular to a length axis of the cavity or perpendicular to an insertion direction of the article. In particular, the cross-section of the cavity may correspond to the shape of the aerosol-generating article to be received therein. Preferably, the cavity has a substantially circular cross-section. Alternatively, the cavity may have a substantially elliptical cross-section or a substantially oval cross-section or a substantially square cross-section or a substantially rectangular cross-section or a substantially triangular cross-section or a substantially polygonal cross-section.

The aerosol-generating device may comprise a main body which preferably includes at least one of the heating arrangement, the controller, the power supply and at least a portion of the cavity. In addition to the main body, the aerosol-generating device may further comprise a mouthpiece, in particular in case the aerosol-generating article to be used with the device does not comprise a mouthpiece. The mouthpiece may be mounted to the main body of the device. The mouthpiece may be configured to close the receiving cavity upon mounting the mouthpiece to the main body. In case the device does not comprise a mouthpiece, an aerosol-generating article to be used with the aerosol-generating device may comprise a mouthpiece, for example a filter plug.

The aerosol-generating device may comprise at least one air outlet, for example, an air outlet in the mouthpiece (if present).

Preferably, the aerosol-generating device comprises an air path extending from the at least one air inlet through the cavity, and possibly further to an air outlet in the mouthpiece, if present. Preferably, the aerosol-generating device comprises at least one air inlet in fluid communication with the cavity. Accordingly, the aerosol-generating system may comprise an air path extending from the at least one air inlet into the cavity, and possibly further through the aerosol-forming substrate within the article and a mouthpiece into a user's mouth.

Preferably, the aerosol-generating device is a puffing device for generating an aerosol that is directly inhalable by a user thorough the user's mouth. In particular, the aerosol-generating device is a hand-held aerosol-generating device.

As mentioned further above, the electronic circuitry of the heating arrangement may be arranged on a printed circuit board (PCB). The printed circuit board may also comprise the controller for detecting the presence, absence, or the displacement of an article.

Accordingly, the temperature sensor may be configured to output a signal indicative of the temperature or a temperature increase of at least one portion of the printed circuit board during operation of the heating arrangement. For that purpose, the temperature sensor may be arranged on the printed circuit board.

Preferably, the heating element of the heating arrangement is not arranged on the printed circuit board. In particular, the electronic circuitry and the heating element may be arranged in separate portions of the aerosol-generating device. Preferably, electronic circuitry is arranged in a distal portion of the aerosol-generating device, whereas the heating element is arranged in a proximal portion of the aerosol-generating device, in particular in the cavity or around the cavity. Due to this, the electronic circuitry is thermally separated from the heating element. As a consequence, the detected temperature or the detected temperature increase is more sensitive to the effect of the actual article position on the temperature of the electronic circuitry.

According to another aspect of the present invention, there is provided an aerosol-generating system comprising an aerosol-generating device according to the present invention and an aerosol-generating article for use with the device, wherein the aerosol-generating article comprises an aerosol-forming substrate to be heated by the device.

As used herein, the term "aerosol-generating system" refers to the combination of an aerosol-generating article as further described herein with an aerosol-generating device according to the invention and as described herein. In the system, the article and the device may cooperate to generate an inhalable aerosol.

As used herein, the term "aerosol-generating article" refers to an article comprising at least one aerosol-forming substrate that, when heated, releases volatile compounds that can form an aerosol. Preferably, the aerosol-generating article is a heated aerosol-generating article. That is, an aerosol-generating article which comprises at least one aerosol-forming substrate that is intended to be heated rather than combusted in order to release volatile compounds that can form an aerosol. The aerosol-generating article may be a consumable, in particular a consumable to be discarded after a single use. For example, the article may be a cartridge including a liquid aerosol-forming substrate to be heated. As another example, the article may be a rod-shaped article, in particular a tobacco article, resembling conventional cigarettes.

As used herein, the term "aerosol-forming substrate" denotes a substrate formed from or comprising an aerosol-forming material that is capable of releasing volatile compounds upon heating for generating an aerosol. The aerosol-forming substrate is intended to be heated rather than combusted in order to release the aerosol-forming volatile compounds. The aerosol-forming substrate may be a solid aerosol-forming substrate, a liquid aerosol-forming substrate, a gel-like aerosol-forming substrate, or any combination thereof. The aerosol-forming substrate may comprise a tobacco-containing material containing volatile tobacco flavor compounds, which are released from the substrate upon heating. Alternatively or additionally, the aerosol-forming substrate may comprise a non-tobacco material. The aerosol-forming substrate may further comprise an aerosol former. Examples of suitable aerosol formers are glycerin and propylene glycol. The aerosol-forming substrate may also comprise other additives and ingredients, such as nicotine or flavourants. The aerosol-forming substrate may also be a paste-like material, a sachet of porous material comprising aerosol-forming substrate, or, for example, loose tobacco mixed with a gelling agent or sticky agent, which could include a common aerosol former such as glycerin, and which is compressed or molded into a plug.

In case the aerosol-generating device comprises an inductive heating arrangement, the aerosol-generating system may comprise at least one susceptor for inductively heating the aerosol-forming substrate. The susceptor may be integral part of the aerosol-generating article. Accordingly, the aerosol-generating article may comprises at least one susceptor positioned in thermal proximity to or thermal contact with the aerosol-forming substrate such that in use the susceptor is inductively heatable by the inductive heating arrangement when the article is received in the cavity of the device. It is also possible that the susceptor is part of the aerosol-generating device. Likewise, in this configuration, the susceptor is arranged in the device such that it is in thermal proximity to or thermal contact with the aerosol-forming substrate, when the article is received in the cavity of the device.

The article may comprise one or more of the following elements: a first support element, a substrate element, a second support element, a cooling element, and a filter element. Preferably, the aerosol-generating article comprises at least a first support element, a second support element and a substrate element located between the first support element and the second support element.

The substrate element preferably comprise the at least one aerosol-forming substrate to be heated. In case the aerosol-generating system is based on induction heating, the substrate element may further comprise a susceptor which is in thermal contact with or thermal proximity to the aerosol-forming substrate.

As used herein, the term "susceptor" refers to an element comprising a material that is capable of being inductively heated within an alternating electromagnetic field. This may be the result of at least one of hysteresis losses or Eddy currents induced in the susceptor, depending on the electrical and magnetic properties of the susceptor material.

At least one of the first support element and the second support element may comprise a central air passage. Preferably, at least one of the first support element and the second support element may comprise a hollow cellulose acetate tube. Alternatively, the first support element may be used to cover and protect the distal front end of the substrate element.

The aerosol-cooling element is an element having a large surface area and a low resistance to draw, for example 15 mmWG to 20 mmWG. In use, an aerosol formed by volatile compounds released from the substrate element is drawn through the aerosol-cooling element before being transported to the proximal end of the aerosol-generating article.

The filter element preferably serves as a mouthpiece, or as part of a mouthpiece together with the aerosol-cooling element. As used herein, the term "mouthpiece" refers to a portion of the article through which the aerosol exits the aerosol-generating article.

All of the aforementioned elements may be sequentially arranged along a length axis of the article in the above described order, wherein the first support element preferably is arranged at a distal end of the article and the filter element preferably is arranged at a proximal end of the article. Each of the aforementioned elements may be substantially cylindrical. In particular, all elements may have the same outer cross-sectional shape. In addition, the elements may be circumscribed by an outer wrapper such as to keep the elements together and to maintain the desired cross-sectional shape of the rod-shaped article. Preferably, the wrapper is made of paper.

Further features and advantages of the aerosol-generating system according to the invention have been described with regard to the aerosol-generating device and equally apply.

According to another aspect of the present invention, there is provided a method for detecting the presence, absence, or displacement of an aerosol-generating article in a cavity of an aerosol-generating device, wherein the device comprises a cavity for removably receiving at least a portion of the article, and an electrical heating arrangement comprising an electronic circuitry and a heating element operatively coupled to the electronic circuitry for heating an aerosol-forming substrate comprised in the article when the article is received in the cavity, the method comprising:

measuring a temperature or an temperature increase of at least one portion of the electronic circuitry during operation of the heating arrangement;

detecting the presence, absence, or displacement of the article in the cavity in response to the temperature or the temperature increase having breached a predefined temperature threshold or a predefined temperature increase threshold, respectively.

As discussed above with regard to the aerosol-generating device according to the present invention, the predefined temperature threshold may be in a range between 80 degree Celsius and 180 degree Celsius, in particular between 100 degree Celsius and 160 degree Celsius. Likewise, the predefined temperature increase threshold may be at least 80 degree Celsius, in particular at least 100 degree Celsius, preferably at least 120 degree Celsius.

As also discussed above with regard to the aerosol-generating device according to the present invention, the predefined temperature increase threshold may be a function, in particular a linear function or a quadratic function of the initial temperature of the at least one portion of the electronic circuitry at the beginning of the operation of the device. Accordingly, the method may comprise detecting the initial temperature of the at least one portion of the electronic circuitry at the beginning of the operation of the device and determining the predefined temperature increase threshold as a function of the detected initial temperature. Likewise, the method may comprise detecting the initial temperature of the at least one portion of the electronic circuitry at the beginning of the operation of the device and re-scaling the temperature increase by a predefined function of the detected initial temperature in order to detect the presence, absence, or displacement of the article in the cavity in response to the re-scaled temperature increase having breached the predefined temperature increase threshold.

In order to save electrical power and to protect the heating arrangement from damages, the method may further comprise stopping or restricting the operation of the electrical heating arrangement in response to detecting the displacement or the absence of the article.

In addition, the method may comprise detecting a presence of the article at a desired position in the cavity in response to the temperature or the temperature increase having fallen below the predefined temperature threshold or the temperature increase threshold. In doing so, the method may further comprise enabling operation of the electrical heating arrangement in response to detecting the presence of the article at the desired position in the cavity.

Preferably, the at least one portion of the electronic circuitry is monitored for excessive temperatures or temperature increases at close intervals. Accordingly, the temperature or the temperature increase of the at least one portion of the electronic circuitry may be measured at least every 10 seconds, in particular at least every 5 seconds, preferably at least every 2 seconds, more preferably at least every second.

Further features and advantages of the method according to the invention have been described with regard to the aerosol-generating device and the aerosol-generating system and equally apply.

The invention is defined in the claims. However, below there is provided a non-exhaustive list of non-limiting examples. Any one or more of the features of these examples may be combined with any one or more features of another example, embodiment, or aspect described herein.

Example Ex1: An aerosol-generating device for heating an aerosol-forming substrate that is capable to form an inhalable aerosol when heated.

Example Ex1A: The aerosol-generating device according to example Ex1 comprising a cavity for removably receiving at least a portion of an aerosol-generating article, wherein the article comprises the aerosol-forming substrate to be heated.

Example Ex1B: The aerosol-generating device according to any one of the preceding examples comprising an electrical heating arrangement.

Example Ex1C: The aerosol-generating device according to example Ex1B, wherein the electrical heating arrangement comprises an electronic circuitry.

Example Ex1D: The aerosol-generating device according to example Ex1B or Ex1C, wherein the electrical heating arrangement comprises a heating element.

Example Ex1Ea: The aerosol-generating device according to example Ex1D, wherein the heating element is operatively coupled to the electronic circuitry.

Example Ex1Eb: The aerosol-generating device according to example Ex1Ea, wherein the heating element is for heating the aerosol-forming substrate when the aerosol-generating article is received in the cavity.

Example Ex1F: The aerosol-generating device according to example Ex1Ea or Ex1Eb comprising a controller comprising a temperature sensor configured to output a signal indicative of the temperature or a temperature increase of at least one portion of the electronic circuitry during operation of the heating arrangement.

Example Ex1G: The aerosol-generating device according to Example Ex1F wherein the controller is configured to detect the presence, absence, or displacement of the article in response to the signal indicating that the temperature or the temperature increase has breached a predefined temperature threshold or a predefined temperature increase threshold, respectively.

Example Ex1H: The aerosol-generating device according to Example Ex1G wherein the controller is configured to detect the presence, absence, or displacement of the article in the cavity.

Example Ex2: The aerosol-generating device according to any one of examples Ex1 to Ex1H, wherein the predefined temperature threshold is in a range between 80 degree Celsius and 180 degree Celsius, in particular between 100 degree Celsius and 160 degree Celsius.

Example Ex3: The aerosol-generating device according to any one of the preceding examples, wherein the predefined temperature increase threshold is at least 80 degree Celsius, in particular at least 100 degree Celsius, preferably at least 120 degree Celsius.

Example Ex4: The aerosol-generating device according to any one of the preceding examples, wherein the predefined temperature increase threshold is a predefined function of the initial temperature of the at least one portion of the electronic circuitry at the beginning of the operation of the device.

Example Ex5: The aerosol-generating device according to any one of example Ex3 or example Ex4, wherein the controller is configured to detect the initial temperature of the at least one portion of the electronic circuitry at the beginning of the operation of the device and to determine the predefined temperature increase threshold as a function of the detected initial temperature.

Example Ex6: The aerosol-generating device according to any one of the preceding examples, wherein the controller is configured to detect the initial temperature of the at least one portion of the electronic circuitry at the beginning of the operation of the device and to re-scale the signal indicative of the temperature increase by a predefined function of the detected initial temperature in order to detect the presence, absence, or displacement of the article in the cavity in response to the re-scaled signal.

Example Ex7: The aerosol-generating device according to any one of the preceding examples, wherein the temperature sensor comprises at least one of a thermocouple, a thermistor or a semiconductor integrated circuit sensor.

Example Ex8: The aerosol-generating device according to any one of the preceding examples, wherein the electrical heating arrangement is an inductive heating arrangement for inductively heating the aerosol-forming substrate within the article.

Example Ex9: The aerosol-generating article according to example Ex8, wherein the heating element comprises at least one induction coil for generating a varying magnetic field within the cavity.

Example Ex10: The aerosol-generating device according to any one of examples Ex1 to Ex7, wherein the electrical heating arrangement is a resistive heating arrangement for resistively heating the aerosol-forming substrate within the article.

Example Ex11: The aerosol-generating device according to example Ex10, wherein the heating element comprises a resistive heating element.

Example Ex12: The aerosol-generating device according to any one of the preceding examples, wherein the electronic circuitry and the heating element are arranged in separate portions of the aerosol-generating device.

Example Ex13: The aerosol-generating device according to any one of the preceding examples, wherein the electronic circuitry is arranged in a distal portion of the aerosol-generating device, and wherein the heating element is arranged in a proximal portion of the aerosol-generating device, in particular in the cavity or around the cavity.

Example Ex14: The aerosol-generating device according to any one of the preceding examples, wherein the controller is configured to stop or to restrict operation of the electrical heating arrangement in response to detecting the displacement or the absence of the article.

Example Ex15: The aerosol-generating device according to any one of the preceding examples, wherein the controller is configured to detect a presence of the article at a desired position in the cavity in response to the signal indicating that the temperature or the temperature increase has fallen below the predefined temperature threshold or the predefined temperature increase threshold, respectively.

Example Ex16: The aerosol-generating device according to example Ex15, wherein the controller is configured to enable heating operation of the electrical heating arrangement in response to detecting the presence of the article at the desired position in the cavity.

Example Ex17: The aerosol-generating device according to any one of the preceding examples, wherein the controller is configured to monitor the temperature of the at least one portion of the electronic circuitry at least every 10 seconds, in particular at least every 5 seconds, preferably at least every 2 seconds, more preferably at least every second.

Example Ex18: An aerosol-generating system comprising an aerosol-generating device according to any one of the preceding examples and an aerosol-generating article for use with the device, wherein the aerosol-generating article comprises an aerosol-forming substrate to be heated by the device.

Example Ex19: A method for detecting the presence, absence, or displacement of an aerosol-generating article in a cavity of an aerosol-generating device, wherein the device comprises a cavity for removably receiving at least a portion of the article, and an electrical heating arrangement comprising an electronic circuitry and a heating element operatively coupled to the electronic circuitry for heating an aerosol-forming substrate comprised in the article when the article is received in the cavity, the method comprising:

measuring a temperature or an temperature increase of at least one portion of the electronic circuitry during operation of the heating arrangement;

detecting the presence, absence, or displacement of the article in the cavity in response to the temperature or the temperature increase having breached a predefined temperature threshold or a predefined temperature increase threshold, respectively.

Example Ex20: The method according to example Ex19, wherein the predefined temperature threshold is in a range between 80 degree Celsius and 180 degree Celsius, in particular between 100 degree Celsius and 160 degree Celsius.

Example Ex21: The method according to any one of examples Ex19 or Ex20, wherein the predefined temperature increase threshold is at least 80 degree Celsius, in particular at least 100 degree Celsius, preferably at least 120 degree Celsius.

Example Ex22: The method according to any one of examples Ex19 to Ex21, further comprising detecting the initial temperature of the at least one portion of the electronic circuitry at the beginning of the operation of the device and determining the predefined temperature increase threshold as a function of the detected initial temperature.

Example Ex23: The method according to any one of examples Ex19 to Ex22, further comprising detecting the initial temperature of the at least one portion of the electronic circuitry at the beginning of the operation of the device and re-scaling the temperature increase by a predefined function of the detected initial temperature in order to detect the presence, absence, or displacement of the article in the cavity in response to the re-scaled temperature increase having breached the predefined temperature increase threshold.

Example Ex24: The method according to any one of examples Ex19 to Ex23, further comprising stopping or restricting the operation of the electrical heating arrangement in response to detecting the displacement or the absence of the article.

Example Ex25: The method according to any one of examples Ex19 to Ex24, further comprising detecting a presence of the article at a desired position in the cavity in response to the temperature or the temperature increase having fallen below the predefined temperature threshold or the temperature increase threshold.

Example Ex26: The method according to example Ex25, further comprising enabling operation of the electrical heating arrangement in response to detecting the presence of the article at the desired position in the cavity.

Example Ex27: The method according to any one of examples Ex19 to Ex26, wherein the temperature or the temperature increase of the at least one portion of the electronic circuitry is measured at least every 10 seconds, in particular at least every 5 seconds, preferably at least every 2 seconds, more preferably at least every second.

BRIEF DESCRIPTION OF THE DRAWINGS

Examples will now be further described with reference to the figures in which.

DETAILED DESCRIPTION

Figure 1:
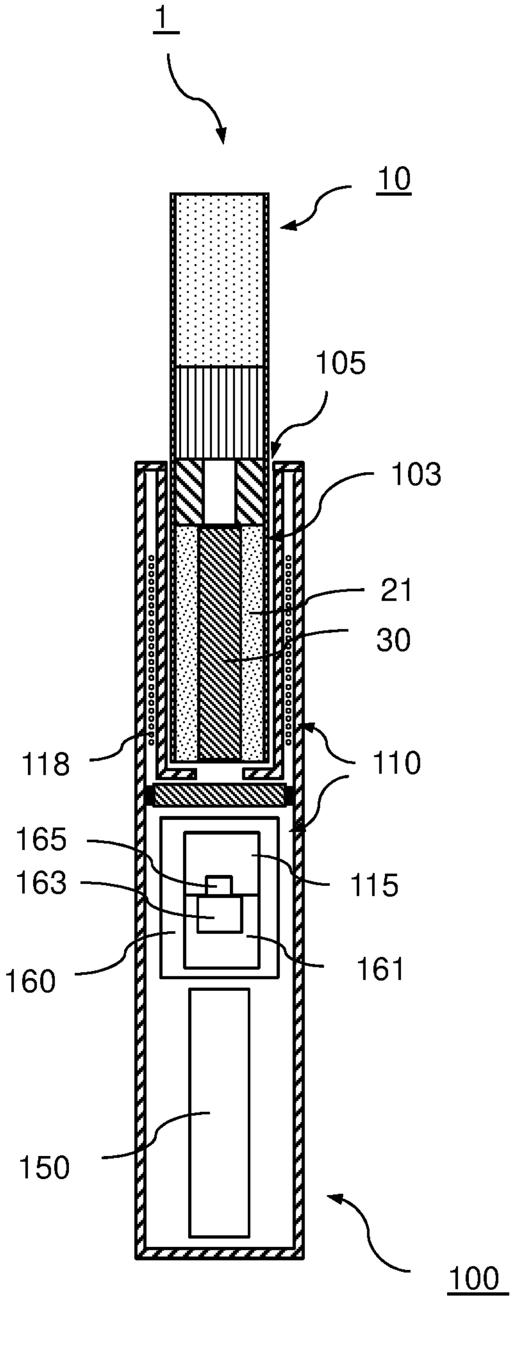
FIGS. 1-2 schematically illustrate an aerosol-generating system according to a first exemplary embodiment of the present invention, including an aerosol-generating device and an aerosol-generating article for use with the device.
Figure 2:
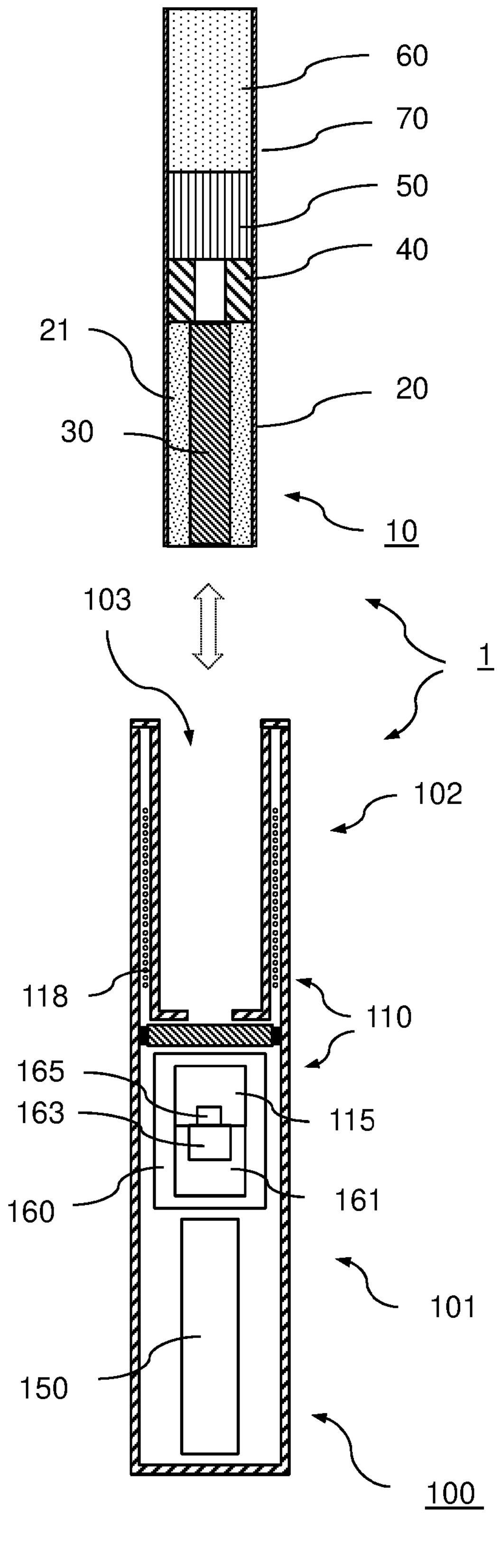

FIG. 1 and FIG. 2 schematically illustrate a first exemplary embodiment of an aerosol-generating system 1 according to the present invention which is used for generating an inhalable aerosol by heating an aerosol-forming substrate. The system 1 comprises an aerosol-generating article 10 which includes the aerosol-forming substrate 21 to be heated, and an aerosol-generating device 100 for inductively heating the substrate upon engaging the article 10 with the device 100.

The aerosol-generating article 10 has a substantially rod-shape resembling the shape of a conventional cigarette. In the present embodiment, the article 10 comprises four elements sequentially arranged in coaxial alignment: a substrate element 20 arranged at a distal end of the article 10, a support element 40 with a central air passage, an aerosol-cooling element 50, and a filter element 60 arranged at a proximal end of the article 10 which serves as a mouthpiece. The substrate element 20 comprises the aerosol-forming substrate 21 to be heated as well as a susceptor 30 which is in direct physical contact with substrate 21 and used to inductively heat the substrate 21. This will be described in more detail below. The four elements have a substantially cylindrical shape with substantially the same diameter. In addition, the four elements are circumscribed by an outer wrapper 70 such as to keep the four elements together and to maintain the desired circular cross-sectional shape of the rod-like article 10. The wrapper 70 preferably is made of paper. Further details of the article 10, in particular of the four elements, are disclosed, for example, in WO 2015/176898 A1.

The elongate aerosol-generating device 100 comprises two portions: a proximal portion 102 and a distal portion 101. In the proximal portion 102, the device 100 comprises a cavity 103 for removably receiving at least a portion of the aerosol-generating article 10. In the distal portion 101, the device 100 comprises a DC power source 150, such as a rechargeable battery, for powering operation of the device, and a printed circuit board 160, which comprises—inter alia—a main control unit 161 for controlling operation of the device 100. For heating substrate, the device 100 comprises an electrical heating arrangement 110 comprising an electrical circuitry 115 and an induction coil 118 for generating an alternating, in particular high-frequency magnetic field within the cavity 103.

In the present embodiment, the induction coil 118 is a helical coil which is arranged in the proximal portion 102 of the device such as to circumferentially surround the cylindrical receiving cavity 103. The coil 118 is arranged such that the susceptor 30 of the aerosol-generating article 10 experiences the electromagnetic field upon engaging the article 10 with the device 100. The alternating magnetic field is used to inductively heat the susceptor 30 within the aerosol-generating article 10 when the article 10 is received in the cavity 103. Thus, upon inserting the article 10 into the cavity 103 of the device 100 (see FIG. 2) and activation of the heating arrangement 110, the alternating electromagnetic field within the cavity 103 induces Eddy currents and/or hysteresis losses in the susceptor 30, depending on the magnetic and electric properties of the susceptor material. As a consequence, the susceptor 30 heats up until reaching a temperature sufficient to vaporize the aerosol-forming substrate 21 surrounding the susceptor 30 within the article 10. In use of the system, when a user takes a puff, that is, when a negative pressure is applied at the filter element 60 of the article 10, air is drawn into the cavity 103 at the rim of the article insertion opening 105 of the device 100. The air flow further extends towards the distal end of the cavity 103 through a passage which is formed between the inner surface of the cylindrical cavity 103 and the outer surface of the article 10. At the distal end of the cavity 103, the air flow enters the aerosol-generating article 10 through the substrate element 20 and further passes through the support element 40, the aerosol cooling element 50 and the filter element 60 where it finally exits the article 10. In the substrate element 20, vaporized material from the aerosol-forming substrate 21 is entrained into the air flow. Subsequently, when passing through the support element 40, the cooling element 50 and the filter element 60 the air flow including the vaporized material cools down such as to form an aerosol escaping the article 10 through the filter element 60.

Figure 3:
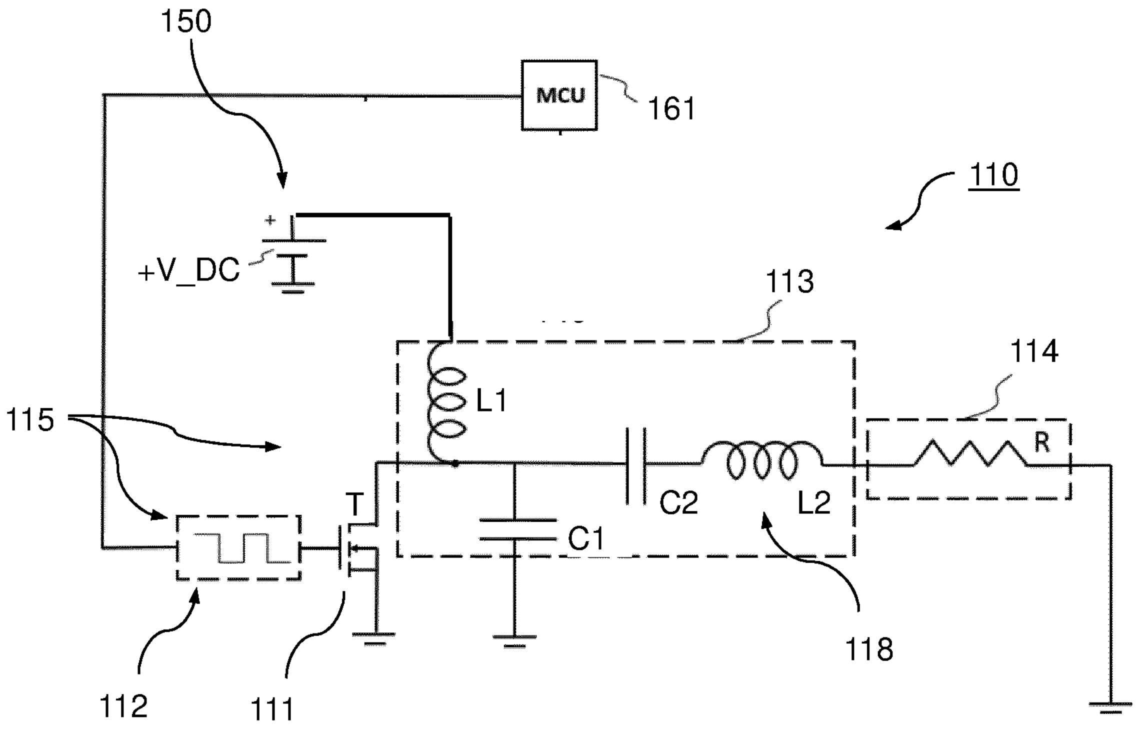
FIG. 3 schematically illustrates the inductive heating arrangement of the aerosol-generating device according to FIG. 1 and FIG. 2.

FIG. 3 shows details of the inductive heating arrangement 110. According to the present embodiment, the inductive heating arrangement 110 comprises a DC/AC inverter which is connect to the DC power source 150 shown in FIGS. 1 and 2. The DC/AC inverter includes a Class-E power amplifier which in turn includes the following components: a transistor switch 111 comprising a Field Effect Transistor T (FET), for example a Metal-Oxide-Semiconductor Field Effect Transistor (MOSFET), a transistor switch supply circuit indicated by the arrow 112 for supplying the switching signal (gate-source voltage) to the transistor switch 111, and an LC load network 113 comprising a shunt capacitor C1 and a series connection of a capacitor C2 and inductor L2. The inductor L2 corresponds to the induction coil 118 shown in FIGS. 1 and 2 used to generate an alternating magnetic field within the cavity 103. In addition, there is provided a choke L1 for supplying a DC supply voltage +V_DC from to the DC power source 150. Also shown in FIG. 3 is the ohmic resistance R representing the total equivalent resistance or total resistive load 114, which—in use of the system, that is, when the article is inserted in the cavity 103 of the device 100—is the sum of the ohmic resistance of the induction coil 118, marked as L2, and the ohmic resistance of the susceptor. Otherwise, in case no article is inserted in the cavity 103, the equivalent resistance or resistive load 114 only corresponds to the ohmic resistance of the induction coil 118. Further details of the inductive heating arrangement 110 according to the present embodiment, in particular with regard to its working principle, are disclosed, for example, in WO 2015/177046 A1.

The electrical circuitry 115 of the electrical heating arrangement 110 (apart from the induction coil 118) is arranged on the printed circuit board 160 together with the main control unit 161.

In order to sufficiently heat the aerosol-forming substrate via the susceptor 30, the ohmic resistance of the susceptor 30 is chosen much larger to be than the ohmic resistance of the induction coil 118 and the components of the electrical circuitry 115. As a consequence, if an aerosol-generating article is properly received in the cavity of the device, power that is provided by the heating arrangement 110 is mostly dissipated in the susceptor 30 and the aerosol-forming substrate 21 in the article 10. Only a small portion of the power is dissipated in the electronic circuitry 115 of the heating arrangement 110. Conversely, if the aerosol-generating article 10 is displaced in the cavity or absent from the cavity, only little (in case of a displacement) or even no power (in case of absence) is dissipated in the susceptor 30, but mostly in the electronic circuitry 115 due to the mismatch of the susceptor 30 relative to the magnetic field of the of the induction coil 118 or due to the absence of the susceptor 30. The additional (exceeding) power dissipation in the electronic circuitry 115 will cause the temperature of at least a portion of the electronic circuitry 115 to change differently than during normal operation, when the article is properly received in the cavity. In particular, the temperature of the at least one portion of the electronic circuitry 115 may increase more rapidly and to temperatures higher than the typical temperatures occurring during normal operation with an article 10 being properly received in the cavity 103 of the device 100.

Figure 4:
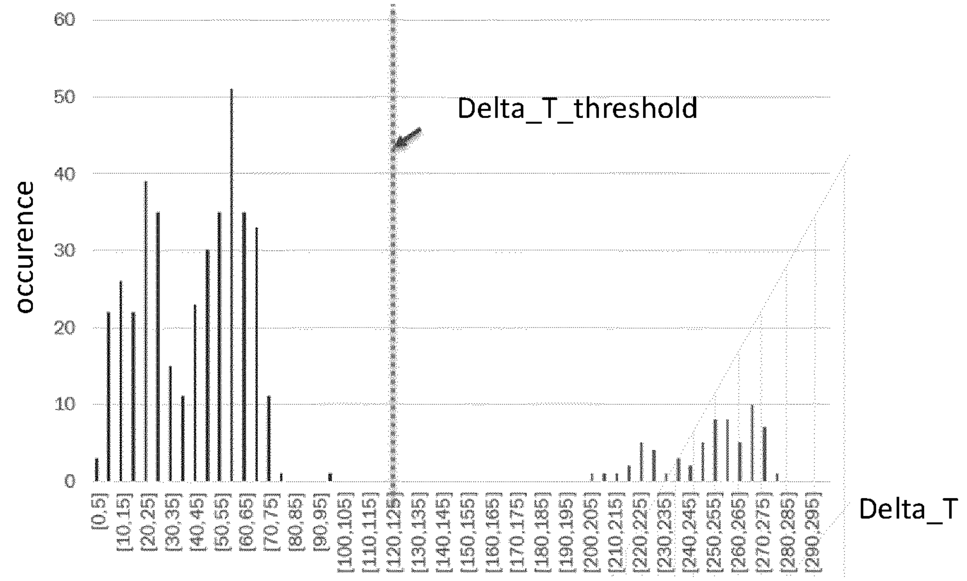
FIG. 4 shows a diagram reflecting the occurrence of temperature increases indicative of the presence, absence or the displacement of an aerosol-generating article in the system according to FIG. 1 and FIG. 2.

This is shown in FIG. 4 which is a diagram reflecting at the left hand side the occurrence of typical temperature increases Delta_T at a specific site of the electronic circuitry 115 during operation of the heating arrangement 110 with an article 10 being properly received in the cavity 103. In contrast, the right hand side of FIG. 4 reflects the occurrence of exceeding temperature increases at that specific site of the electronic circuitry 115 with an article being displaced in the cavity 103 or being absent from the cavity 103. Here, the temperature increase Delta_T is defined as Delta_T=[T(t2)−T(t1)], wherein T(t1) is the initial temperature of the at least one portion of the electronic circuitry at a first time t1 during operation of the heating arrangement 110 and, T(t2) is the temperature of the at least one portion of electronic circuitry at the second time t2 or after elapse of predefined time period t=t2−t1 after the first time t1. For example, T(t1) may be the initial temperature of at least one portion of the electronic circuitry 115 at the beginning of a calibration operation of the device, whereas T(t2) is the temperature of the at least one portion of electronic circuitry 2 seconds or 5 seconds later.

The above described correlation between the presence, absence or displacement of an aerosol-generating article 10 in the cavity 103 and the temperature or temperature increase of at least a portion of the electronic circuitry 115 advantageously used to detect the presence, absence or displacement of an article 10 in the cavity 103 of the device 100. For this, the aerosol-generating device 100 comprises a controller 163 which is part of the main control unit 161. As shown in FIG. 1 and FIG. 2, the controller 163 comprises a temperature sensor 165 that is arranged in thermal contact to a portion of the electronic circuitry 115 of the heating arrangement 110 and configured to output a signal indicative of the temperature or a temperature increase of that portion. The temperature sensor 165 may be a thermocouple, a thermistor or a semiconductor integrated circuit sensor. The controller 163 is configured to detect the presence, absence, or displacement of the article 10 in the cavity 103 in response to the signal indicating that the temperature or the temperature increase has breached a predefined temperature threshold or a predefined temperature increase threshold Delta_T_threshold, respectively.

Again with reference to FIG. 4, the predefined temperature increase threshold Delta_T_threshold is preferably chosen such as to be between typical temperature increases Delta_T at that portion of the electronic circuitry 115 with an article 10 being properly received in the cavity 103, and exceeding temperature increases at that portion with an article being displaced in the cavity 103 or being absent from the cavity 103. In the present embodiment, the predefined temperature threshold Delta_T_threshold is chosen to be about 120 degree Celsius, as indicated by the dashed vertical line in the diagram according to FIG. 4. Due to this, the controller is able to reliable differentiate between normal temperature increases during operation of the heating arrangement 110 indicating the presence of an article 10 correctly positioned in the cavity 103 and exceeding temperature increases indicating the absence or an displacement of the article 10.

In the present embodiment, the controller 163 in combination with the temperature sensor 165 may be configured to take two subsequent measurements of the temperature of the electronic circuitry 115, and to determine a signal indicative of the temperature increase by taking the difference of the temperature signals of the subsequent temperature measurements, and finally to compare the signal indicative of the temperature increase of the at least one portion of the electronic with the predefined temperature increase threshold. If the signal indicative of the temperature increase is higher than or equal to the predefined temperature increase threshold, the controller 163 may detect the displacement or absence of the article. Conversely, if the signal indicative of the temperature increase is lower than the predefined temperature increase threshold, the controller 163 may detect the presence of the article in the cavity.

In order to save electrical power and to protect the heating arrangement 110 from damages, the controller 163 may be further configured to stop or to restrict operation of the heating arrangement 110, in case the displacement or absence of the article 10 is detected. Likewise, the controller 163 may configured to enable heating operation of the electrical heating arrangement 110 in response to detecting the presence of the article 10 at the desired position in the cavity 103.

Figure 5:
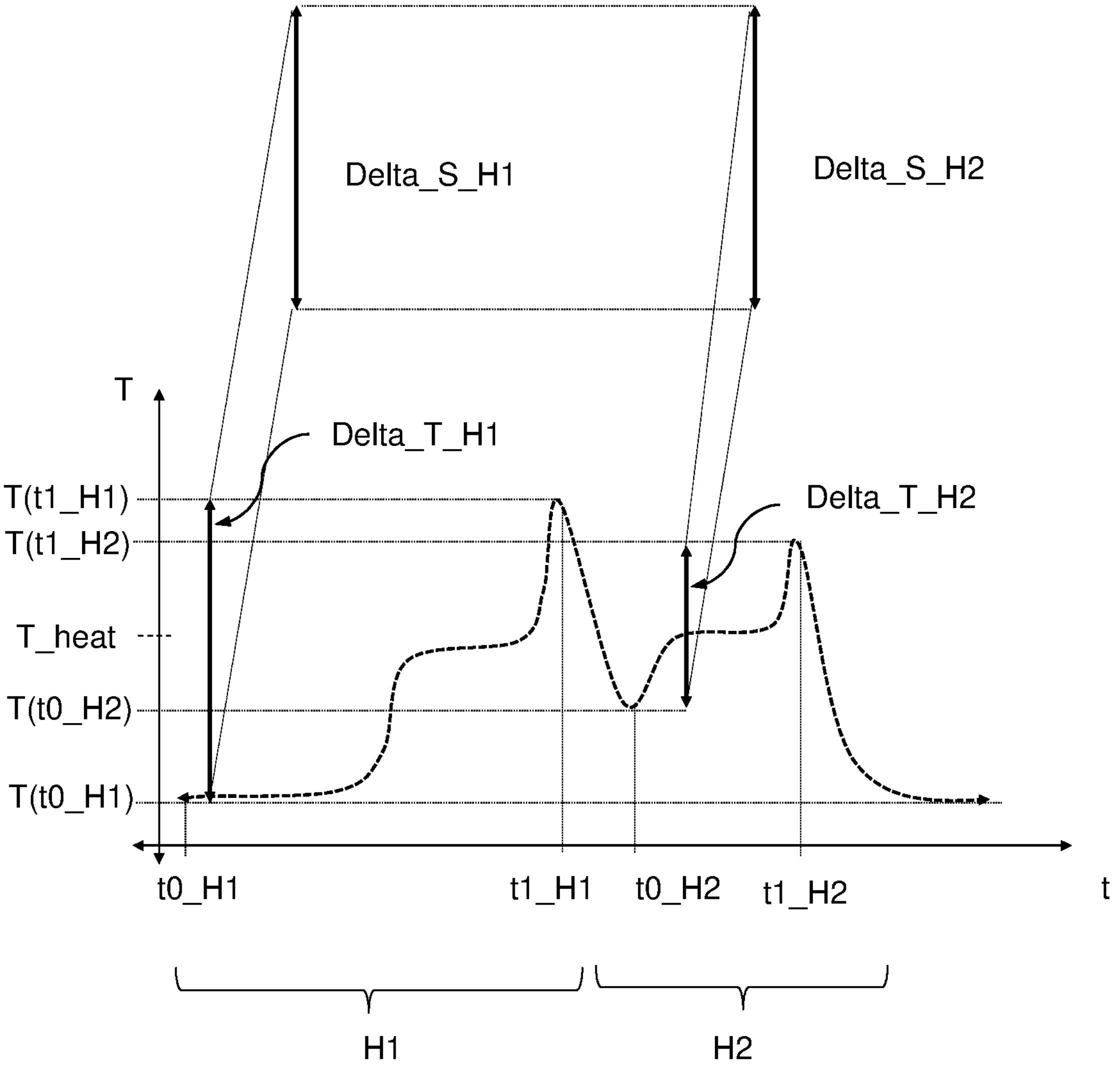
FIG. 5 shows a diagram reflecting a temperature profile of the electronic circuitry of the heating arrangement of the aerosol-generating device according to FIG. 1 and FIG. 2 for subsequent heating processes.

The detection of the presence, absence, or displacement of an aerosol-generating article in the cavity may also take into account that the heating rate of the electronic circuitry 115 is smaller if the initial temperature of the electronic circuitry 115 is already high at the beginning of the operation of the device, for example, when a new heating process follows shortly after a previous one. Such a situation is shown in FIG. 5 which schematically illustrates the temperature T over time t of the electronic circuitry 115 of the heating arrangement according to FIGS. 1 and 2 for two subsequent heating processes H1 and H2. As can be seen in FIG. 5, the first heating process H1 starts at the time t0_H1 at a temperature T(t0_H1) which is, for example, at about room temperature. When an article 10 is received in the cavity 103 of the device 100 the temperature T of the electronic circuitry 115 increases during heating operation to a temperature T_heat, as illustrated by the first plateau in the heating profile according to FIG. 5. When the article 10 is removed from the device 100, the temperature T of the electronic circuitry 115 increases further increases to until reaching a value T(t1_H1) at time T1_H1) for which the temperature increase as compared to the initial temperature, that is, Delta_T_H1=T(t1_H1)−T(t0_H1) breaches a predefined temperature increase threshold which is indicative for the absence of an article. This may be detected by the controller which—in response to this—may stop the first heating processes. As a consequence, the temperature T of the electronic circuitry 115 again decreases towards the initial temperature.

If during that cool down a user starts a second heating H2, the initial temperature T(t0_H2) of the second heating process H2 may be higher than the initial temperature T(t0_H1) of the first heating process H1. Accordingly, the heating rate of the electronic circuitry 115 may be smaller during the second heating process H2 than during the first heating process H1 because heating of a mass by a fixed temperature requires more heat if the mass has a higher initial temperature than if the mass has a lower initial temperature at the beginning of the heating process. As a consequence, when an article 10 is removed from the cavity 103 during the second heating process, the actual temperature increase Delta_T_H2=T(t1_H2)−T(t0_H2) of the electronic circuitry 115 during the second heating process H2 is lower than the corresponding actual temperature increase Delta_T_H1=T(t1_H1)−T(t0_H1) of the electronic circuitry 115 during the first heating process H1.

In order to compensate for this difference, the temperature increase or the signal indicative of the temperature increase may be re-scaled by a predefined function of the initial temperature of the electronic circuitry at the beginning of the respective heating operation H1, H2. For example, in case the signal output of the temperature sensor 165 shown in FIG. 1 and FIG. 2 is an ADC (Analog-Digital-Converter) value which correlates with temperature such that the ADC value is low when the temperature is high, while the ADC value is high when the temperature is low (see above), re-scaling may be done by dividing the signal indicative of the temperature increase by the signal indicative of the initial temperature of the respective heating operation. For example, the signal indicative of the temperature increase may be re-scaled according to the following function: Delta_S_scal=k*[S(t0)−S(t1)]/S(t0), wherein Delta_S_scal is the re-scaled signal indicative of the temperature increase to be compared with a predefined signal value corresponding to the predefined temperature increase threshold, S(t0) is the signal indicative of the initial temperature of the electronic circuitry 115 at the beginning of the respective heating operation H1, H2 and S(t1) is the signal indicative of the temperature of the electronic circuitry 115 at a later time t2 of the respective heating operation H1, H2. The coefficient k is a constant obtainable by calibration. In doing so, more weight is given to the temperature increase when the electronic circuitry 115 of the device 10 is (still) at a higher level, for example, due to a previous heating process. In particular, the re-scaling function may be chosen such that the absence of an article is detected within about the same time period or a predefined time range after its removal for each heating process irrespective of the actual initial temperature. That is, as shown in FIG. 5, the re-scaling function may be chosen such that the respective re-scaled signal Delta_S_scal indicative of the temperature increase is at about the same value after the same time period or a predefined time range after removal of the article for each heating process, irrespective of the actual initial temperature.

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein. In this context, therefore, a number A is understood as A±5 percent of A. Within this context, a number A may be considered to include numerical values that are within general standard error for the measurement of the property that the number A modifies. The number A, in some instances as used in the appended claims, may deviate by the percentages enumerated above provided that the amount by which A deviates does not materially affect the basic and novel characteristic(s) of the claimed invention. Also, all ranges include the maximum and minimum points disclosed and include any intermediate ranges therein, which may or may not be specifically enumerated herein.

The invention claimed is:

1. An aerosol-generating device for heating an aerosol-forming substrate to form an inhalable aerosol when heated, the aerosol-generating device comprising:

a cavity configured to removably receive at least a portion of an aerosol-generating article, comprising the aerosol-forming substrate to be heated;

an electrical heating arrangement comprising an electronic circuitry and a heating element operatively coupled to the electronic circuitry configured to heat the aerosol-forming substrate when the aerosol-generating article is received in the cavity; and a controller comprising a temperature sensor configured to output a signal indicative of a temperature or a temperature increase of at least one portion of the electronic circuitry during operation of the electrical heating arrangement, wherein the controller is configured to detect an absence or a displacement of the aerosol-generating article in the cavity in response to the signal indicating that the temperature or the temperature increase has breached a predefined temperature threshold or a predefined temperature increase threshold, respectively, wherein the controller is configured to stop or restrict the operation of the electrical heating arrangement in response to detecting the absence or the displacement of the aerosol-generating article.

2. The aerosol-generating device according to claim 1, wherein the predefined temperature threshold is in a range between 80 degrees Celsius and 180 degrees Celsius.

3. The aerosol-generating device according to claim 1, wherein the predefined temperature threshold is in a range between 100 degrees Celsius and 160 degrees Celsius.

4. The aerosol-generating device according to claim 1, wherein the predefined temperature increase threshold is a predefined function of an initial temperature of the at least one portion of the electronic circuitry at a beginning of the operation of the aerosol-generating device.

5. The aerosol-generating device according to claim 4, wherein the controller is further configured to detect the initial temperature of the at least one portion of the electronic circuitry at the beginning of the operation of the aerosol-generating device and to determine the predefined temperature increase threshold as a function of the detected initial temperature.

6. The aerosol-generating device according to claim 1, wherein the controller is further configured to detect an initial temperature of the at least one portion of the electronic circuitry at a beginning of the operation of the aerosol-generating device and to re-scale the signal indicative of the temperature increase by a predefined function of the detected initial temperature in order to detect the absence or the displacement of the aerosol-generating article in the cavity in response to the re-scaled signal.

7. The aerosol-generating device according to claim 1, wherein the temperature sensor comprises at least one of a thermocouple, a thermistor, or a semiconductor integrated circuit sensor.

8. The aerosol-generating device according to claim 1, wherein the electrical heating arrangement is an inductive heating arrangement configured to inductively heat the aerosol-forming substrate within the aerosol-generating article.

9. The aerosol-generating device according to claim 1, wherein the electrical heating arrangement is a resistive heating arrangement configured to resistively heat the aerosol-forming substrate within the aerosol-generating article.

10. The aerosol-generating device according to claim 1, wherein the electronic circuitry and the heating element are arranged in separate portions of the aerosol-generating device.

11. The aerosol-generating device according to claim 1, wherein the controller is further configured to detect a presence of the aerosol-generating article at a desired position in the cavity in response to the signal indicating that the temperature or the temperature increase has fallen below the predefined temperature threshold or the predefined temperature increase threshold, respectively.

12. The aerosol-generating device according to claim 11, wherein the controller is further configured to enable a heating operation of the electrical heating arrangement in response to detecting the presence of the aerosol-generating article at a desired position in the cavity.

13. The aerosol-generating device according to claim 1, wherein the controller is further configured to monitor the temperature of the at least one portion of the electronic circuitry at least every 10 seconds.

14. The aerosol-generating device according to claim 1, wherein the controller is further configured to monitor the temperature of the at least one portion of the electronic circuitry at least every second.

15. An aerosol-generating system comprising an aerosol-generating device according to claim 1 and an aerosol-generating article for the aerosol-generating device, wherein the aerosol-generating article comprises an aerosol-forming substrate to be heated by the aerosol-generating device.

16. A method for detecting an absence or a displacement of an aerosol-generating article in a cavity of an aerosol-generating device, wherein the aerosol-generating device comprises a cavity for removably receiving at least a portion of the aerosol-generating article, and an electrical heating arrangement comprising an electronic circuitry and a heating element operatively coupled to the electronic circuitry for heating an aerosol-forming substrate comprised in the aerosol-generating article when the aerosol-generating article is received in the cavity, the method comprising:

measuring a temperature or an temperature increase of at least one portion of the electronic circuitry during operation of the electrical heating arrangement;

detecting the absence or the displacement of the aerosol-generating article in the cavity in response to the temperature or the temperature increase having breached a predefined temperature threshold or a predefined temperature increase threshold, respectively; and stopping or restricting the operation of the electrical heating arrangement in response to the detecting the absence or the displacement of the aerosol-generating article.

17. An aerosol-generating device for heating an aerosol-forming substrate to form an inhalable aerosol when heated, the aerosol-generating device comprising:

a cavity configured to removably receive at least a portion of an aerosol-generating article, comprising the aerosol-forming substrate to be heated;

an electrical heating arrangement comprising an electronic circuitry and a heating element operatively coupled to the electronic circuitry configured to heat the aerosol-forming substrate when the aerosol-generating article is received in the cavity; and a controller comprising a temperature sensor configured to output a signal indicative of a temperature or a temperature increase of at least one portion of the electronic circuitry during operation of the electrical heating arrangement, wherein the controller is configured to detect a presence of the aerosol-generating article in the cavity in response to the signal indicating that the temperature or the temperature increase has breached a predefined temperature threshold or a predefined temperature increase threshold, respectively, wherein the controller is further configured to enable the operation of the electrical heating arrangement in response to detecting the presence of the aerosol-generating article at a desired position in the cavity.

18. A method for detecting a presence of an aerosol-generating article in a cavity of an aerosol-generating device, wherein the aerosol-generating device comprises a cavity for removably receiving at least a portion of the aerosol-generating article, and an electrical heating arrangement comprising an electronic circuitry and a heating element operatively coupled to the electronic circuitry for heating an aerosol-forming substrate comprised in the aerosol-generating article when the aerosol-generating article is received in the cavity, the method comprising:

measuring a temperature or an temperature increase of at least one portion of the electronic circuitry during operation of the electrical heating arrangement;

detecting the presence of the aerosol-generating article in the cavity in response to the temperature or the temperature increase having breached a predefined temperature threshold or a predefined temperature increase threshold, respectively; and enabling the operation of the electrical heating arrangement in response to the detecting the presence of the aerosol-generating article.

* * * * *